United States Patent
Wittorf et al.

(10) Patent No.: US 7,782,184 B2
(45) Date of Patent: Aug. 24, 2010

(54) METHOD AND SYSTEM FOR IMPROVING TRAFFIC SAFETY

(75) Inventors: Marten Wittorf, Ingelheim (DE); Lars Hoffmann, Brålanda (SE)

(73) Assignee: GM Global Technology Operations, Inc., Detroit, MI (US)

(*) Notice: Subject to any disclaimer, the term of this patent is extended or adjusted under 35 U.S.C. 154(b) by 666 days.

(21) Appl. No.: 11/515,878

(22) Filed: Sep. 6, 2006

(65) Prior Publication Data

US 2007/0102214 A1 May 10, 2007

(30) Foreign Application Priority Data

Sep. 6, 2005 (SE) .................................... 0501963

(51) Int. Cl.
*B60Q 1/26* (2006.01)
(52) U.S. Cl. ..................... 340/468; 340/463; 340/435
(58) Field of Classification Search ................ 340/901, 340/902, 903, 425.5, 435, 436, 438, 463, 340/815.45, 468; 701/35, 45, 301; 345/82; 362/464, 104, 283
See application file for complete search history.

(56) References Cited

U.S. PATENT DOCUMENTS

| | | | | |
|---|---|---|---|---|
| 5,343,206 | A * | 8/1994 | Ansaldi et al. ............... 342/70 |
| 6,240,346 | B1 * | 5/2001 | Pignato ....................... 701/35 |
| 6,281,806 | B1 | 8/2001 | Smith et al. |
| 6,879,263 | B2 * | 4/2005 | Pederson et al. ....... 340/815.45 |
| 6,947,576 | B2 * | 9/2005 | Stam et al. .................. 382/104 |
| 6,993,159 | B1 * | 1/2006 | Ishii et al. ................... 382/104 |
| 7,046,160 | B2 * | 5/2006 | Pederson et al. ....... 340/815.45 |
| 7,209,221 | B2 * | 4/2007 | Breed et al. ................ 356/5.02 |
| 7,347,595 | B2 * | 3/2008 | Brun et al. .................. 362/464 |
| 7,359,782 | B2 * | 4/2008 | Breed ........................... 701/45 |
| 7,429,918 | B2 * | 9/2008 | Watanabe ................... 340/468 |
| 2002/0080618 | A1 | 6/2002 | Kobayashi et al. |
| 2004/0066376 | A1 | 4/2004 | Donath et al. |
| 2004/0252516 | A1 | 12/2004 | Brun et al. |

FOREIGN PATENT DOCUMENTS

| | | |
|---|---|---|
| DE | 10227170 | 1/2004 |
| GB | 2395390 | 5/2004 |

OTHER PUBLICATIONS

Search Report (PCT/ISA/201), Feb. 17, 2006.

* cited by examiner

*Primary Examiner*—Van T. Trieu
(74) *Attorney, Agent, or Firm*—Harness, Dickey & Pierce, P.L.C.

(57) ABSTRACT

A method and system for improving traffic safety when driving a vehicle on a roadway including detecting at least one object in the immediate surroundings of the vehicle, analyzing the at least one detected object, deciding whether the at least one analyzed object is relevant in terms of traffic safety to the driving of the vehicle, and illuminating, via a light source, the roadway with a light pattern indicating the at least one object which is considered to be relevant in terms of traffic safety to the driving of the vehicle, thereby improving traffic safety.

20 Claims, 2 Drawing Sheets

METHOD AND SYSTEM FOR IMPROVING TRAFFIC SAFETY

PRIORITY STATEMENT

The present application hereby claims priority under 35 U.S.C. §119 on Swedish patent application No. SE 0501963-3 filed Sep. 6, 2005, the entire contents of which is hereby incorporated herein by reference.

FIELD

The invention generally relates to a method and/or a system for improving traffic safety when driving a vehicle on a roadway.

BACKGROUND ART

Vehicular traffic claims many victims every year. A large number of these accidents occur when driving in the dark and under bad weather conditions. Modern vehicles, such as for example cars, trucks and busses, are sometimes equipped with electronic systems which are adapted to support the driver when driving under unfavorable weather conditions. Some of these electronic systems are, for example, configured to adaptively direct or turn the headlights of the vehicle while taking a curve. Other systems are configured in such a manner that a display mounted in the vehicle shows objects that are considered to be important in driving the vehicle.

Systems of the latter type which show important objects on a display mounted in the vehicle suffer from a serious drawback since they force the driver to divert his attention from the road, which results in the driver being distracted and makes driving tiring. Moreover, the creation of a virtual image of the road on a display mounted in the vehicle makes the driver tend to rely on the image shown on the display, and not on the actual circumstances.

US 2004/0066376 aims at solving this problem by mounting a projector in the vehicle to project an amplified image of the road in front of the vehicle on the windshield of the vehicle. This system is both complicated and expensive and is not suitable for the current vehicle industry where cost is a crucial aspect.

US 2004/025216 has a different approach to solve the above problems. The system disclosed in this patent application aims to detecting an individual in a road scenery and illuminate this road scenery by a vehicle headlight, illumination occurring through an image mask. As a result, the detected individual will not be dazzled by the vehicle headlight while at the same time the road scenery around the individual will be illuminated.

However, the use of this system results, in the same way as mentioned above, in the attention of the driver of the vehicle being diverted from the road in order to locate the illuminated portions around the detected individual.

SUMMARY

It will thus be appreciated that there is a need for a new method of improving traffic safety when driving a vehicle, especially under unfavorable weather conditions.

In at least one embodiment of the present invention, a method and a corresponding system are provided to improve upon or even solve at least one of the above problems.

A first aspect of at least one embodiment of the invention concerns a method for improving traffic safety when driving a vehicle on a roadway. The method includes detecting at least one object in the immediate surroundings of said vehicle, analyzing said at least one detected object, deciding if said at least one analyzed object is relevant in terms of traffic safety to the driving of said vehicle, and illuminating, via a light source, the roadway with a light pattern indicating the at least one object which is considered to be relevant in terms of traffic safety to the driving of said vehicle, thereby improving traffic safety.

The method is advantageously suited for motor-driven vehicles such as cars, trucks and busses, but may, of course, be used for example by motorcycles. "Roadway" includes the area on which the vehicle is driven, in the normal case an asphalt-paved roadway, but the method is obviously also suitable for use in, but not limited to, the driving of a vehicle on a gravel road or a roadway where the weather conditions have changed the state of the road on which the vehicle is driven, for example where the roadway has been covered with ice and/or snow.

A person skilled in the art realizes that the term "object" in this case should be interpreted to include an object positioned in the immediate surroundings of the vehicle that is being driven on the roadway. In the normal case, such an object can be, for example, an individual, an animal or an obstacle which is positioned on or adjacent to the roadway. An object can also, but not exclusively, be an edge belonging to the roadway, a ditch bank, a crash barrier, a snow stick, a road sign or a road marking such as a center line or an edge line.

An advantage with the method according to at least one embodiment of the present invention thus is that by illuminating the roadway in front of the vehicle with a light pattern indicating the type of object involved, for example an individual walking alongside the roadway or an animal moving towards the roadway, the driver can be informed of objects approaching the immediate surroundings without having to divert his attention from the roadway. The method is particularly suitable for use when driving vehicles under unfavorable traffic and weather conditions, such as dark, rain, snow, fog or the like, but a person skilled in the art realizes that the method is also suitable under other traffic and weather conditions.

In an example embodiment, the step of deciding whether said at least one analyzed object is relevant in terms of traffic safety to the driving of said vehicle comprises the step of determining a traffic safety relevance index for said at least one object. To determine a traffic safety relevance index refers to classifying, by object detection and object analysis, an object based on the inherent properties of the object. These properties can be, for example, size and temperature of the object.

In an example embodiment, the step of determining said traffic safety relevance index comprises the step of determining a motion vector of said at least one object. The motion vector of an object consists of a collection of parameters, for instance speed, acceleration and direction of the object. By determining these parameters of the object and combining them with the inherent properties of the object, a traffic safety relevance index can be calculated, which constitutes a value of how relevant in terms of traffic safety the detected object is to the driving of the vehicle on the roadway.

An advantage of calculating a traffic safety relevance index is that different independent detected objects can be ranked. As such, the light pattern indication on the roadway can be controlled and adjusted so that a suitable amount of information is presented to the driver. For example, the objects which have the highest traffic safety relevance index and are most relevant to the driving of the vehicle may be indicated first and/or most distinctly.

In one example embodiment, the method according to the present invention comprises the step of retrieving data on the immediate surroundings of said vehicle. The immediate surroundings of the vehicle preferably consists of an area in front of said vehicle in the traveling direction of said vehicle, which means the area which is in front of the vehicle in the normal advancing travel direction of the vehicle.

In an example embodiment, data on the immediate surroundings of the vehicle is retrieved via at least one camera, a radar and/or a device for retrieving position based navigation information. A person skilled in the art realizes that, for example, thermal, CMOS and/or CCD cameras can be used for this purpose, just as well as different types of radar system can be used based on the type of object that is to be detected.

Position based navigation information may include global positioning data (GPS) in combination with detailed information about roads and current roadworks or traffic detours. An important advantage of this example embodiment may be that the various types of retrieved data can be used each separately or in combination, thus making it possible to create an image of the immediate surroundings of the vehicle that is as true as possible.

In a further example embodiment of the present invention, the illumination of the roadway is performed by way at least one headlight and/or a laser light source. Different types of light sources are suitable for various purposes, and in this case the headlight is adapted to create simpler and larger patterns while a laser light source, by its possibility of generating intense and concentrated light beams, is suited to create complex light patterns.

In another example embodiment, xenon headlights are used, which emit a very strong and intense light. Xenon light is based on the electric arc technique, is available for both full and dipped headlights (BiXenon), and is especially convenient in snow and rain. A combination of a plurality of light sources can of course be used.

The traffic safety relevance index of the detected object may be used to vary the wavelength of the emitted light. This is advantageous since the driver can be informed of the traffic relevance of different objects not only by indication but also by color variation. A person skilled in the art also realizes that the light pattern can be pulsed based on the traffic safety relevance index of the detected object.

Another aspect of at least one embodiment of the invention concerns a system for improving traffic safety when driving a vehicle on a roadway, comprising means for detecting at least one object in the immediate surroundings of said vehicle, means for analyzing said at least one detected object, means for deciding whether said at least one analyzed object is relevant in terms of traffic safety to the driving of said vehicle, and means for illuminating, by means of a light source, the roadway with a light pattern indicating the at least one object which is considered to be relevant in terms of traffic safety to the driving of said vehicle, thereby improving traffic safety.

As described above in relation to the first aspect of an embodiment of the present invention, this system offers the possibility of illuminating the roadway in front of the vehicle with a light pattern indicating the type of object involved, for instance an individual walking alongside the roadway or an animal moving towards the roadway. Thus, the driver can be informed of objects approaching the immediate surroundings without diverting his attention from the roadway. The system is particularly suited for use in driving vehicles under unfavorable traffic and weather conditions, such as dark, rain, snow, fog or the like, but a person skilled in the art realizes that the system is also suited for other traffic and weather conditions.

BRIEF DESCRIPTION OF THE DRAWINGS

The invention will in the following be described in more detail with reference to the accompanying schematic drawings which by way of example illustrate an example embodiment of the invention.

DETAILED DESCRIPTION OF EXAMPLE EMBODIMENTS

Figure 1:
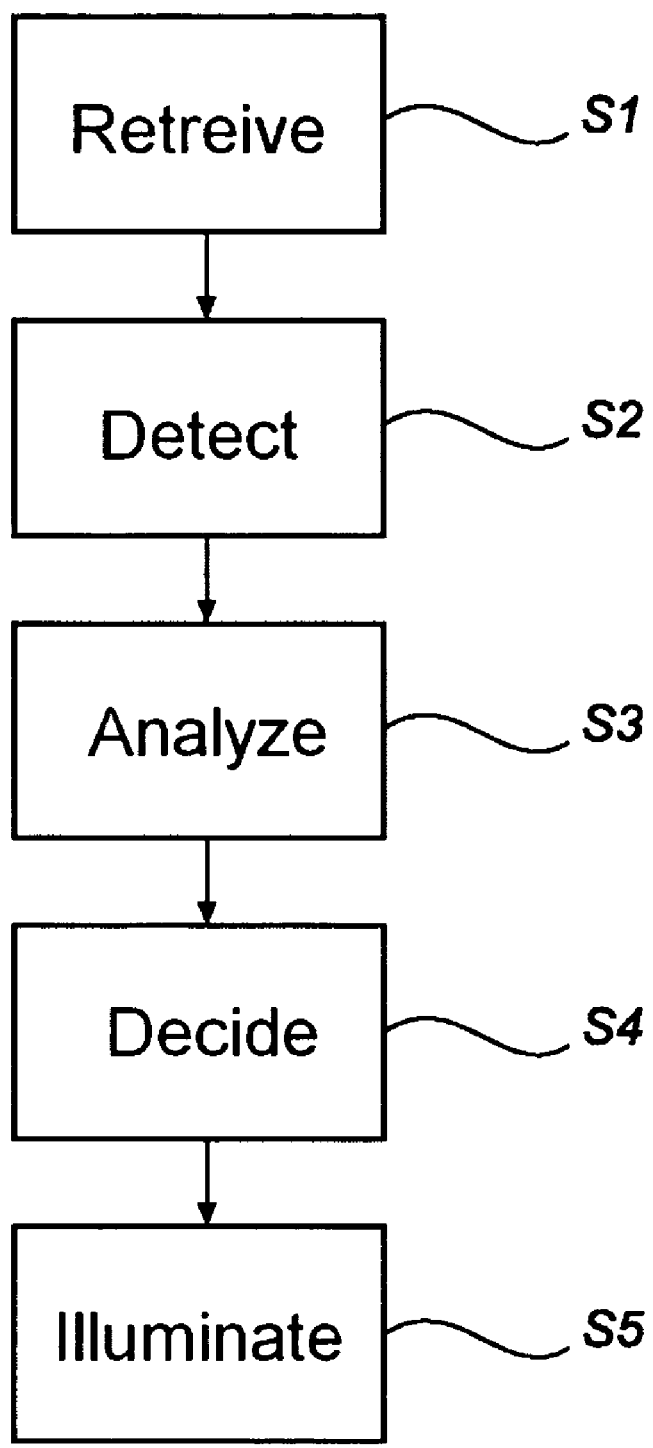
FIG. 1 is a flow chart describing a method according to an embodiment of the present invention for improving traffic safety.

FIG. 1 is a flow chart describing a method according to an embodiment of the present invention for improving traffic safety. The flow chart shows the steps, S1 to S5, which are performed in an example embodiment of the present invention.

In step S1, data on the immediate surroundings of the vehicle is retrieved. This is done by retrieving data from for instance, one of, or a combination of, a camera, (for instance a thermal, CMOS and/or CCD camera) and/or radar equipment. The different types of cameras are suited to retrieve various types of information; for instance a thermal camera is suited to retrieve position and temperature information about an individual or an animal moving adjacent to the roadway. Radar equipment advantageously functions to assess, for instance, the distance to an adjacent object.

Figure 2:
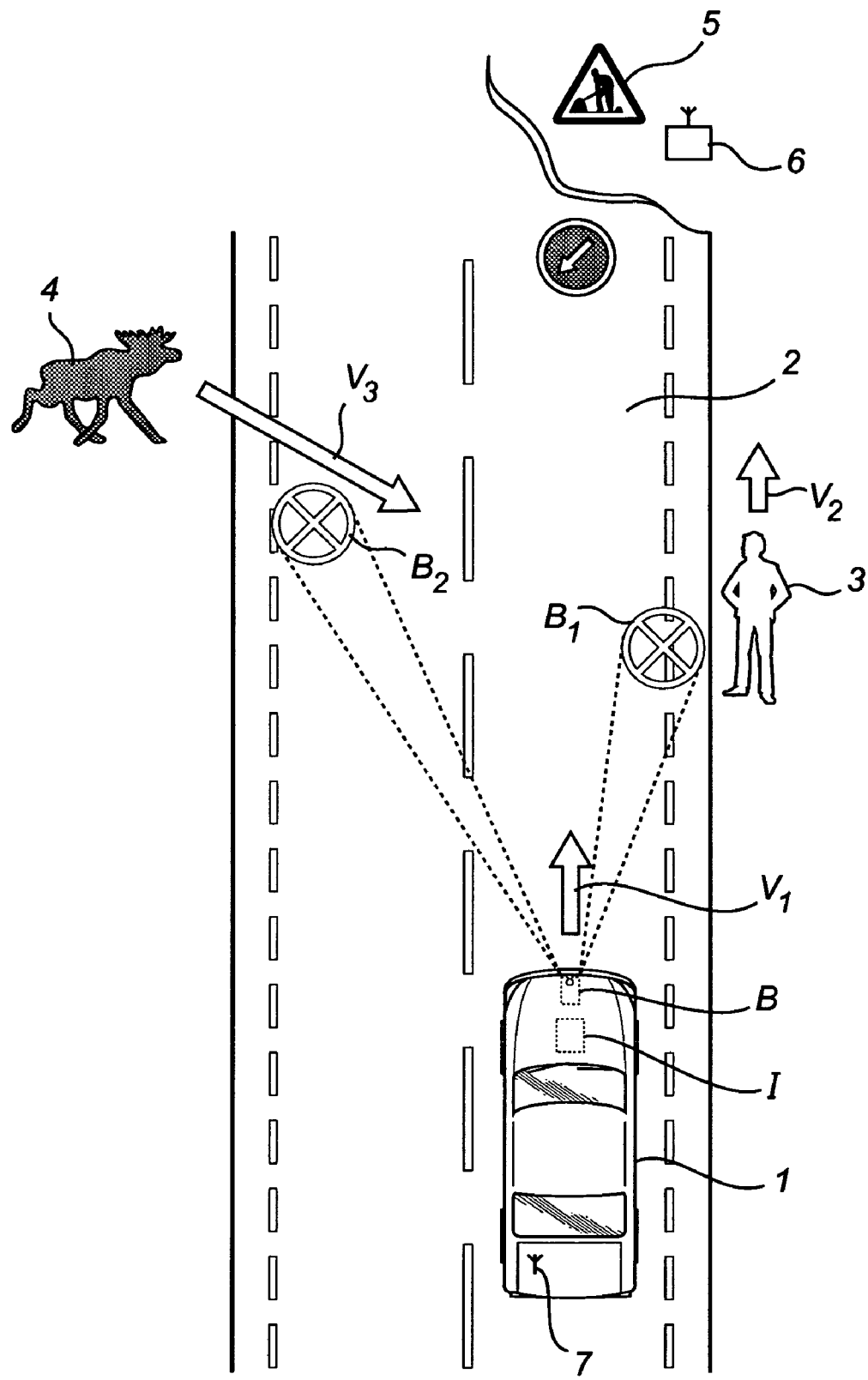
FIG. 2 illustrates a system according to an embodiment of the present invention, which is mounted on a car that is being driven on a roadway.

In an example embodiment, a camera and/or radar information are combined with position based navigation information. Position based navigation information preferably includes global positioning data (GPS) in combination with detailed information on roads and current roadworks or traffic detours. Of course, there is also a possibility of using local traffic detour information, where, for example, a roadwork transmits local information relating to the current state of traffic. An example of this is illustrated in FIG. 2.

In step S2, detection of relevant objects is performed in the retrieved data. Relevant objects are in this case objects which in one way or another relate to the traffic safety of the vehicle driven.

In step S3, an analysis of the detected objects is performed and a virtual image of the area in front of the vehicle is created. For instance, detected edge and/or central lines on the road are suitably used to decide the position of the vehicle on the roadway. In the same way, when driving a vehicle on a roadway covered with snow and ice it is possible to use snow sticks in order to decide the position of the vehicle on the roadway.

Having created a virtual image of the area in front of the vehicle, it is decided in step S4 whether one or some of the objects detected are relevant in terms of traffic safety to the driving of the vehicle. Suitably, the objects that are considered to be relevant in terms of traffic safety are categorized and given a traffic safety relevance index. By using data that has been retrieved over time, a motion vector of the detected objects can be determined. Preferably, this vector includes at least information about direction, speed and acceleration of the object. The motion vector is used in the categorization and determination of traffic safety relevance indices.

Based on the information derived in step S1 to S4, there is in step S5 performed an illumination of one or more areas, preferably, but not exclusively, the area in front of the vehicle. A person skilled in the art realizes that by illuminating the roadway in front of the vehicle adjacent to the objects that are considered to be relevant in terms of traffic safety, the driver of the vehicle can keep concentrated on the roadway while he at the same time is given important information about objects which when driving in the dark and under poor weather conditions can be difficult, or even impossible, to notice.

The light pattern and/or the wavelength with which the roadway is illuminated suitably varies according to the traffic safety relevance index which is calculated in step S4. A person skilled in the art also realizes that different types of light sources are suited for illumination according to step S5, such as normal headlights which emit light at variable wavelengths and/or laser light sources which emit concentrated light by which complex light patterns can be created.

FIG. 2 shows a car 1 which is driven on a two-lane roadway 2. The car 1 is moving forwards in its ordinary direction of travel with a motion vector $V_1$. A device I for retrieving data on the immediate surroundings of the vehicle is mounted on the car 1. To the right of the roadway there is an individual 3 moving with a motion vector $V_2$, mainly parallel to the roadway 2. The individual 3 is assigned a relatively low traffic safety relevance index since he is no danger to the traffic, but the driver should nevertheless be informed of the presence of the individual 3. This is done by a light source B emitting a light pattern $B_1$ with which the roadway 2 adjacent to the individual 3 is illuminated.

To the left of the roadway 2 there is an animal 4 moving with a motion vector $V_3$. By analyzing motion vectors $V_1$ and $V_3$, it will be realized that the animal 4 may be a danger to the vehicle 1. The animal 4 is assigned a relatively high traffic safety relevance index since the animal 4 is a danger to traffic. The light source B therefore emits a light pattern $B_2$ with which the roadway 2 adjacent to the animal 4 is illuminated and which is related to the traffic safety relevance index assigned to the animal 4. To increase the driver's attention to the animal 4 the light pattern $B_2$ is suitably pulsed.

Out of sight, at a longer distance from the car 1, there is a roadwork 5. At the roadwork 5, a transmitter 6 is arranged, which transmits local information on the traffic conditions prevailing close to the roadwork 5. The car 1 is equipped with a receiver 7 which retrieves the local information on the traffic conditions. Based on the retrieved information, the driver can be informed in time about the prevailing traffic conditions by a light pattern being illuminated on the roadway 2.

To conclude, it may be added that the invention is in no way limited to the embodiments described. For example, the method and the system can be arranged to detect the outer edges of a roadway, in which case a light pattern in the form of a road marking can be illuminated on the roadway to make it easier for the driver to drive the vehicle. In a special case when driving a vehicle on a roadway covered with snow, snow sticks arranged at the outer edges of the roadway are detected. Based on the detected snow sticks and an analysis performed by the system according to an embodiment of the present invention, the wavelength of the emitted light can be adjusted so that, for example, red light patterns in the form of road marking can be illuminated on the roadway.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of improving traffic safety when driving a vehicle on a roadway, comprising:
   detecting at least one object in the immediate surroundings of the vehicle;
   analyzing said at least one detected object;
   deciding whether said at least one analyzed object is relevant in terms of traffic safety to the driving of the vehicle; and
   illuminating, via a light source, the roadway with a light pattern indicating the at least one object which is considered to be relevant in terms of traffic safety to the driving of the vehicle, thereby improving traffic safety.

2. A method as claimed in claim 1, wherein the step of deciding whether said at least analyzed object is relevant in terms of traffic safety to the driving of said vehicle comprises the step of determining a traffic safety relevance index indicative of a relative danger to traffic safety of said at least one object.

3. A method as claimed in claim 2, wherein the step of determining a traffic safety relevance index comprises the step of determining a motion vector of said at least one object.

4. A method as claimed in claim 2, wherein the step of illuminating the roadway includes projecting a light pattern that corresponds to the determined traffic safety index.

5. A method as claimed in claim 2, wherein said light source emits light varying with a wavelength which depends on the traffic safety relevance index of said at least one object.

6. A method as claimed in claim 1, wherein the method further comprises retrieving data on the immediate surroundings of said vehicle.

7. A method as claimed in claim 1, wherein the immediate surroundings of said vehicle includes an area in front of the vehicle in the traveling direction of the vehicle.

8. A method as claimed in claim 1, wherein the step of retrieving data on the immediate surroundings of the vehicle occurs by use of at least one of a camera, a radar, and a device for retrieving position based navigation information.

9. A method as claimed in claim 1, wherein the step of illuminating the roadway with a light pattern includes pulsing the light pattern to increase attention on the object.

10. A method as claimed in claim 1, wherein the roadway light indication is separate provided separate from the analyzed object.

11. A method as claimed in claim 1, wherein the roadway light indication is a light pattern indication.

12. A method as claimed in claim 1, illuminating the roadway with a light pattern includes illuminating the roadway in a direction of the analyzed object which the vehicle is approaching with a light pattern indicating a type of object involved.

13. A system for improving traffic safety when driving a vehicle on a roadway, comprising:
   means for detecting at least one object in the immediate surroundings of the vehicle;
   means for analyzing said at least one detected object;
   means for deciding whether said at least one analyzed object is relevant in terms of traffic safety to the driving of the vehicle; and
   means for illuminating, via a light source, the roadway with a light pattern indicating the at least one object which is considered to be relevant in terms of traffic safety to the driving of the vehicle, thereby improving traffic safety.

14. A system as claimed in claim 13, wherein the means for deciding whether said at least analyzed object is relevant in terms of traffic safety to the driving of the vehicle comprises a means for determining a traffic safety relevance index indicative of a relative danger to traffic safety of said at least one object.

15. A system as claimed in claim 14, wherein the means which determines the traffic safety relevance index comprises a means for determining a motion vector of said at least one object.

16. A system as claimed in claim 14, wherein the means which determines a traffic safety relevance safety comprises a means for determining a motion vector of said at least one object.

17. A system as claimed in claim 13, further comprising means for retrieving data on the immediate surroundings of said vehicle.

18. A system as claimed in claim 13, wherein the means which retrieves data on the immediate surroundings of said vehicle is one of a camera, a radar, and a device for retrieving position based navigation information.

19. A system as claimed in claim 13, wherein the means which illuminates the roadway is one of a headlight and a laser light source.

20. A system as claimed in claim 13, wherein the means which illuminates the roadway emits light varying with a wavelength which depends on the traffic safety relevance index of said at least one object.

* * * * *